US008208001B2

(12) United States Patent
Tucker et al.

(10) Patent No.: US 8,208,001 B2
(45) Date of Patent: Jun. 26, 2012

(54) SYSTEM AND METHOD FOR ENCODING CHANGES FOR VIDEO CONFERENCING THROUGH A SET-TOP BOX

(75) Inventors: Curtis E. Tucker, Lee's Summit, MO (US); Shekhar Gupta, Overland Park, KS (US); Robert J. Morrill, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 912 days.

(21) Appl. No.: 12/209,518

(22) Filed: Sep. 12, 2008

(65) Prior Publication Data
US 2010/0066808 A1    Mar. 18, 2010

(51) Int. Cl.
*H04N 7/15* (2006.01)
(52) U.S. Cl. ............... 348/14.08; 348/14.09; 348/14.12
(58) Field of Classification Search .............. 348/14.01, 348/14.03, 14.04, 14.05, 14.08, 14.09, 14.12, 348/14.13; 370/259, 260; 709/204; 725/106, 725/109, 110, 131, 139
See application file for complete search history.

(56) References Cited

U.S. PATENT DOCUMENTS

| 3,818,352 | A | 6/1974 | Moran |
| 6,101,480 | A | 8/2000 | Conmy et al. |
| 6,956,623 | B1 | 10/2005 | Staller |
| 2002/0147979 | A1* | 10/2002 | Corson ........................ 725/90 |
| 2004/0257434 | A1* | 12/2004 | Davis et al. ............... 348/14.13 |
| 2007/0277221 | A1* | 11/2007 | Davis et al. .................. 725/151 |

FOREIGN PATENT DOCUMENTS

| EP | 1 791 354 AS | 5/2007 |
| WO | WO 01/95616 A3 | 12/2001 |

OTHER PUBLICATIONS

"Programming Your VCR to Automatically Change Channels to Record a Program", 3 pgs., http://www.comcast.com/images/ImageLibrary/FAQ/PDF/Programming%20Your%20VCR%20to%20Automatically%20Change%20and%20Record%20Channels.pdf.
wwwen.zte.com, "IPTV—Building a Bridge though Communication", 3 pgs, copyright 1985-2008 ZTE Corporation.
www.Reuters.com, "Shanghai's Oriental Cable Network Selects Cisco to Deploy First ROADM Networking Technology in Mainland China" 3 pgs., Jan. 17, 2008.
www.sysmaster.com, "Tornado M10 Digital Media Center", 3 pgs., copyright 2001-2008 Sysmaster Corp.
Ishikawa, N. et al, "The design of a set-top box with video encoder and its application to video conferencing", 2 pgs., May 1998 (CAT. INIST).
Whitepapers.zdnet.com, "Cable Network Builds Interactive Television Application on Cutting-Edge Technology", 3 pg., Aug. 8, 2008.

* cited by examiner

*Primary Examiner* — Tuan Nguyen
(74) *Attorney, Agent, or Firm* — Patton Boggs, LLP

(57) ABSTRACT

A system and method for adjusting resolution for a video conference through a set-top box. An invitation to accept a video conference is accepted through a set-top box. A line resolution for the video conference is set based on user input. A determination is made whether available bandwidth is at a threshold to support the line resolution. The line resolution is adjusted based on the determination. The video conference is implemented utilizing the adjusted line resolution.

20 Claims, 7 Drawing Sheets

SYSTEM AND METHOD FOR ENCODING CHANGES FOR VIDEO CONFERENCING THROUGH A SET-TOP BOX

BACKGROUND OF THE INVENTION

The use of and development of media services has grown nearly exponentially in recent years. The growth is fueled by larger networks with more reliable protocols and better communications hardware available to service providers and consumers. In particular, many users receive satellite, cable, Internet Protocol television (IPTV), and other media services for display on one or more televisions within a home, business, or organization.

Many users have one or more set-top, digital video recorders (DVR), personal video recorders (PVR), and home network devices in their home, business, or organization. In many cases, the functionality of these devices are limited to very narrow applications. As a result, additional features and services have not been readily available through these devices.

SUMMARY

One embodiment provides a system and method for adjusting resolution for a video conference through a set-top box. An invitation to accept a video conference may be accepted through a set-top box. A line resolution for the video conference may be set based on user input. A determination may be made whether available bandwidth is at a threshold to support the line resolution. The line resolution may be adjusted based on the determination. The video conference may be implemented utilizing the adjusted line resolution.

Another embodiment provides a system for video conferencing. The system may include a server configured to provide a website accessible by a remote user through a network connection. The remote user selects to initiate a video conference with a user by sending an invitation. The system may also include a set-top box in communication with the server operable to implement the video conference in response to the user accept the invitation from the remote user to begin a video conference. The set-top box may set a line resolution for the video conference based on user input. The set-top box may determine whether available bandwidth is at a threshold to support the line resolution. The set-top box may adjust the line resolution in response to determining the line resolution is not at a threshold.

Yet another embodiment provides a set-top box for video conferencing. The set-top box may include a processor for executing a set of instructions and a memory for storing the set of instructions. The set of instructions may be configured to receive an invitation to accept a video conference through the set-top box, set a line resolution for the video conference based on user input, determine whether available bandwidth is at a threshold to support the line resolution, implement the video conference utilizing the line resolution, and adjust the line resolution based on the determination.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

An illustrative embodiment of the present invention provides a system and method for video conferencing through a set-top box or television forwarding device. In one embodiment, a television forwarding device is configured for access and control by a local or remote user. For example, a remote user may initiate a video conference with family members by accessing the television forwarding device with a personal computing device through a website. The communicating parties may control the settings, user preferences, configuration, and other software and hardware elements of the video conference. In one embodiment, the remote user may entirely control the video conference. The television forwarding device is a network device configured to store, manage, stream, and allow user access to media content. The set-top box is a device configured to process an incoming media signal or communication for display by a television or other similar device.

Another illustrative embodiment provides a system and method for adjusting resolution of a video conference image. The resolution or size of the video conference image may be adjusted automatically based on the available bandwidth or based on a user selection. The available bandwidth is the bandwidth that may be used for video conferencing. The available bandwidth may be specified by an allotment or based on one or more thresholds. Additional devices, users, and applications may indicate the available bandwidth for video conferencing while ensuring that the other communications may still occur. For example, the line resolution and corresponding picture size of a video conference image may be automatically reduced from a highest level to a next highest level in response to the available bandwidth decreasing based on utilization of a data-enabled phone.

Figure 1:
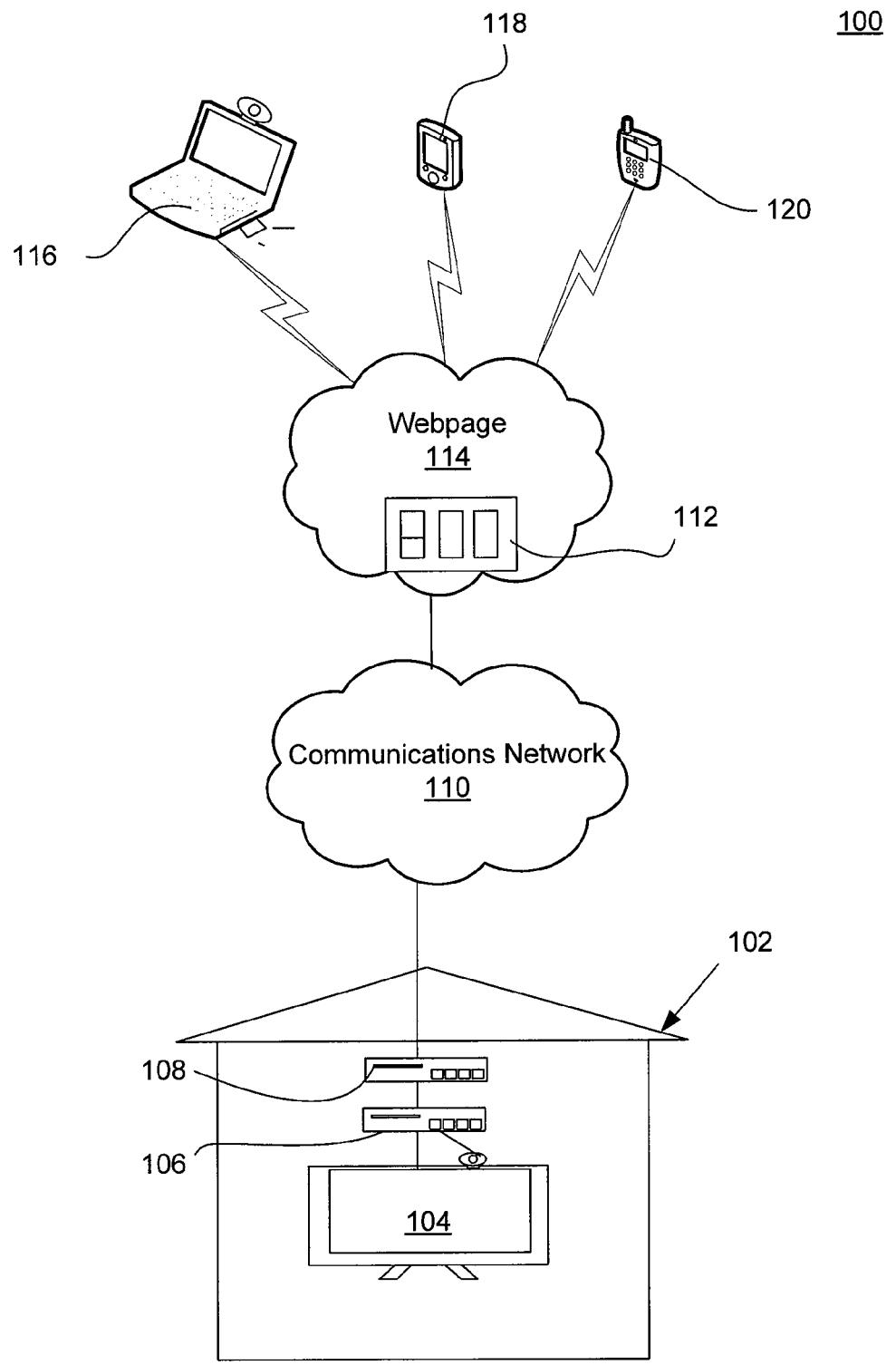
FIG. 1 is a pictorial representation of a communications environment in accordance with an illustrative embodiment.

FIG. 1 is a pictorial representation of a communications environment 100 in accordance with an illustrative embodiment. The communications environment 100 represents the systems and environments in which media and network communications occur in an illustrative embodiment. The communications environment 100 may include a home 102, a television 104, a television forwarding device 106, a set-top box 108, a communications network 110, a communications management system 112, a webpage 114, and wireless devices 116, 118, and 120. In one embodiment, the different elements and components of the communications environment 100 may be utilized to perform video conferencing enabled by the television forwarding device 106 or the set-top box 108.

Communications within the communications environment 100 may occur on any number of networks which may include wireless networks, data or packet networks, cable networks, satellite networks, Internet Protocol television (IPTV) networks, private networks, publicly switched telephone networks (PSTN), or other types of communication networks. The communications network 110 is infrastructures for sending and receiving messages and signals according to one or more designated formats, standards, and protocols. The communications network 110 of the communications environment 100 may represent a single communication service provider or multiple communications services providers. The features, services, and processes of the illustrative embodiments may be implemented by one or more elements of the communications environment 100 independently or as a networked implementation.

The different elements and components of the communications environment 100 may communicate using wireless communications, such as satellite connections, WiFi, WiMAX, code division multiple access (CDMA) wireless networks, and/or hardwired connections, such as fiber optics, T1, cable, DSL, high-speed trunks, and telephone lines. The wireless devices 116, 118, and 120 may communicate with the communications management system 112 and communications network 110 using communications protocols, such as time division multiple access (TDMA), CDMA, global systems for mobile (GSM) communications, personal communications systems (PCS), WLAN, WiMAX, or other frequently used cellular and data communications protocols and standards. The wireless devices 116, 118, and 120 may include cellular phones, Blackberry® devices, personal digital assistances (PDA), mp3 players, laptops, evolution data optimized (EDO) cards, multi-mode devices, and other wireless communication devices and elements. The communications network 110 may include various fiber optics, cables, transmission towers, antennas, or other elements for transmitting voice communications to the connected telephonic devices. The video conference signals may include a video and audio component communicated using any number of standards and protocols. The video conference signals may be communicated as data, packets, or other types of analog and digital signals.

The communications management system 112 is one or more network devices utilized to enable, initiate, route, and manage media content and video communications between one or more communications devices. The communications management system 112 may include one, or more devices networked to manage the communications network 110. For example, the communications management system 112 may include any number of servers, routers, switches, or advanced intelligent devices. The communications network 110 sends and receives the electronic signals through any number of transmission mediums. The communications network 110 and the communications management system 112 may include IPTV or cable middleware. In one embodiment, the video conferencing signals may be encoded and decoded by the television forwarding device 106 or set-top box 108 utilizing the MPEG 2 or 4 standards.

The communications network 110 may include middleware that is used by a cable television or IPTV provider. The middleware may communicate using the same language, standards, or protocols as the communications management system 112 to setup a call for video conferencing.

The call/video conference may be initiated by a remote user utilizing any of the wireless devices 116, 118, and 120. In one embodiment, the remote user initiates the call from the wireless device 116. The signaling protocol of the communications management system 112 identifies call parameters and information about the remote user and associated wireless device 116, as well as features that may be utilized. The signaling protocol may be used between the communications management system 112 and the communications network 110. Separate or integrated signaling protocols may be used to communicate with the set-top box 108 and television forwarding device 106, as well. One or more manufacturers of the set-top box 108 and television forwarding device 106, as well as one or more communications service providers, may coordinate transmission protocols and software integration for ensuring that handshakes and communications occur seamlessly.

The remote user accessing one of the wireless devices 116, 118, and 120 may be authenticated by the communications management system 112 for communication with the television forwarding device. Once authenticated, the middleware of the communications network 110 may communicate with the communications management system to negotiate digital rights management (DRM) protocols and procedures. For example, the communications network 110 or communications management system 112 may include back office systems, such as a DRM key server to provide security certificates allowing encryption between the systems of the home 102 and a remote user participating in a video conference communication. In one embodiment of the communications environment 100, the DRM management key server provides the set-top box 108 the DRM key to validate authentication to begin IPTV video conferencing services. The television forwarding device 106 may receive the communications once they have been decrypted by the set-top box 108. In other words, the middle ware and DRM key server of the communications management system 112 and communications network 110 and the set-top box, and/or the television forwarding device 106 may work together to provide the encryption and decryption for the video conferencing data payload. Without DRM or other similar protections, copies of the payload or the video conferencing call may be spoofed or viewed by other viewers.

The communications management system 112 may further include other middleware that facilitates and enables the video conference options. For example, the communications management system 112 may include a database for storing user contacts and authorization information. The database may be used for provisioning the conferencing services that are being provided to one or more users in the home 102. The communications management system 112 may utilize a database or server that includes digital rights management (DRM) to provide a user access to one or more set-top boxes. For example, a child that lives in the home may utilize the wireless device 116 to access the set-top box 108 in response to the DRM database being checked to verify that the user or wireless device 116 is a subscriber of the video conferencing service available through the communications service provider. The communications management system 112 may also include a digital rights management server configured to authenticate users and communicate encrypted video conference signals.

The home 102 as shown in FIG. 1 is an example of a dwelling structure. In other embodiments, the home 102 may be a business, organization, or other structure where people live, work, or otherwise congregate. The television 104 is a display device that displays television content and programs. The television 104 may display either digital or analog signals. The television 104 may be a CRT monitor, an LCD television, a computer monitor, a plasma television, or other display device suitable for displaying images and media content to a user. The set-top box 108 is a device configured to manage, format, and display media, data, and security content communicated to the television 104. The set-top box 108 may communicate information to the television 104 wirelessly or through a wired connection, such as an electrical or fiber connection. In one example, the set-top box 108 is a cable box provided by a cable or satellite television/Internet provider. In another example, the set-top box 108 is or may include an enhanced digital video recorder for displaying television content and recording and displaying security content as needed.

As shown, a network connection from the communications network 110 provides a content stream including video, data, media, and other interactive content to the television 104. The connection may be a hard wired line, such as fiber-optic, DSL, cable, Ethernet, twisted-pair, or other communication medium suitable for communicating data. The television connection may alternatively be a wireless connection for receiving television content and security content. The data may be received from a satellite, cable, telephone, cellular, Internet service, or other communications service provider. The set-top box 108 may be used to select the normal viewing content, order programs, record programs, and control the television 104 as specified by the user. One or more remote controls, touch screens, or interfacing elements may receive user input for the television 104, television forwarding device 106, and the set-top box 108.

The television 104 may be connected to any number of peripheral devices for displaying alternatively received content. In one embodiment, the television 104 is connected to the television forwarding device 106. The television forwarding device 106 is a network device configured to stream media to a remote user from the television forwarding device 106 or from the set-top box 108 through a network connection. In one embodiment, the television forwarding device 106 is a Slingbox™ or a slingbox equivalent. The television forwarding device 106 may be integrated with or include a gaming system, a media system, personal video recorder, or any other device that streams television content or media to the television 104.

The television 104, the television forwarding device 106, and/or the set-top box 108 may include an external or internal video camera. The video camera may be a hard or soft camera that may be wired or wirelessly connected to the respective device. The video camera may record video or other images for communication to the wireless devices 116, 118, or 120. For example, the video camera may be an IP camera or high-resolution web camera connected to the television forwarding device 106 through a universal serial bus (USB) port. In another embodiment, the set-top box may include a directional video camera that may pan, tilt, zoom, and otherwise be locally or remotely managed.

The content stream available through the network connection may be established with IPTV network components by sending an add stream or stream origination request. The add stream request may be a message or command sent from the set-top box 108 that requests a content stream for a specified channel, video-on-demand, program, or other media content. The add stream request may be authenticated based on information, passwords, or other identifiers sent by the set-top box 108. The IPTV network may use Internet Group Management Protocols (IGMP), control signals, configurations, formats, and standards for receiving broadcasts.

In one embodiment, a DVR is integrated with the set-top box 108 or television forwarding device 106. The set-top box 108 may allow a user to receive digital television service through the network connection using Internet Protocol over a network infrastructure. The set-top box 108 may be a device that functions as a translator or intermediary between the communications network 110 and the television forwarding device 106 and/or television 104. The set-top box 108 and/or television forwarding device 106 may convert, format, or translate the signal received through the network connection to be displayed on the screen of the television 104.

In the communications environment 100, the set-top box 108 may be a computer or computing device providing communications on an IP network and decoding the video streaming media for display by the television 104. The set-top box 108 and television forwarding device 106 may record media content in a digital format to a disk drive or other memory medium. The set-top box 108 and television forwarding device 106 may include a processor, memory, bus, chipsets, video cards, encoders/decoders, interfaces, adapters, transceivers, and other common computing and communications elements. The set-top box 108 allows a user to specify and change the content stream streamed through the network connection to the television 104.

In particular, the set-top box 108 and television forwarding device 106 may store and/or execute programs, operating systems, or instructions for controlling the media content, playback, user interaction, and other interactive features available to a user through the television 104. The set-top box 108 and television forwarding device 106 may enable a user to capture video, media, or other content for playback from a disk or a memory of the set-top box 108 or television forwarding device 106. The set-top box 108 and television forwarding device 106 may provide the user with the ability to record programs, features, or other media for play back at the user's convenience.

In one embodiment, the set-top box 108 and television forwarding device 106 may be configured to perform video conferencing with a remote user. For example, a remote user may utilize the wireless device 116 which may be a laptop with a microphone and web camera to initiate a video call with a user in the home 102 through the television forwarding device 106. The user may set preferences in the set-top box 108 and television forwarding device 106 for performing video conferences.

The set-top box 108, television forwarding device 106, and the television 104 may communicate through a hard-wired or wireless connection. In one embodiment, the set-top box 108 and television 104 may communicate through a display interface, such as a high-definition multi-media interface (HDMI). The display interface is the communications medium and interface for communicating signals between the television forwarding device 106 and the television 104 or the set-top box 108 and the television. However, the display interface or connection may be any digital audio/video interface suitable for transmitting and/or compressing media streams. The set-top box 108, television forwarding device 106, and the television 104 may use any number of digital connection or analog standards and converters to send and receive information.

In another embodiment, the set-top box 108, television forwarding device 106, and the television 104 may communicate through a wireless connection, such as Bluetooth® or WiFi, such as IEEE 802.11(n). The connection between the set-top box 108 and/or television forwarding device 106 and the television 104 may be used to carry video, audio, and other device controlling signals that are part of the video conference. In one embodiment, each device may include a public or private IP address that allows devices to audibly and visually communicate with one another. Other wireless standards and protocols may be similarly used to allow the set-top box 108 and television 104 to communicate in different rooms or locations.

The user and the remote user may be required to download, install, or otherwise access software clients, audio/video encoders and decoders, DRM keys, drivers, or other hardware or software elements to enable video conferencing through the set-top box 108, television forwarding device 106, wireless devices 116, 118, and 120. In one embodiment, the set-top box 108 acts as an interface or pass-through device for enabling video conferencing through the television forwarding device 106. For example, the set-top box 108 may provide a high speed logical interface to a data connection to the television forwarding device 106 through a USB connection.

The set-top box 108 may be configured to send add stream requests for a number of televisions. In one example, the set-top box 108 may request a high-definition MPEG 4 content stream for the television that uses 8 MB. However, the bandwidth required for different video compression standards may vary based on the applicable formats, content service provider, user and provider devices, and content formats. The set-top box 108 and/or the television forwarding device 106 may be configured to download a software client, application, or add-on from the communications management system 112. In one embodiment, the set-top box 108 may only act as a network interface or pass-through device and may not be required to take part in the video conferencing technology.

Quality of service (QoS) is an added feature for each user who may subscribe to video conferencing services. In one embodiment, the user may be required to pay a larger monthly service fee or charge as compared to those that do not have a guaranteed QoS. For example, the QoS guarantee may ensure data speeds and functionality for the users on the IPTV or cable television network. The same QoS or guarantees may not be in place for the remote user that may be communicating with the set-top box 108, television forwarding device 106 through a public or private network connection. This application incorporates by reference utility application Ser. No. 12/174,411, filed on Jul. 16, 2008. The references in the above included application that refer to security surveillance communications, systems, devices, services, and equipment may be considered as video conferencing equivalents in an illustrative embodiment. The incorporated reference provides further disclosure and details regarding communications, interfacing standards and protocols, and middle ware functionality.

Figure 2:
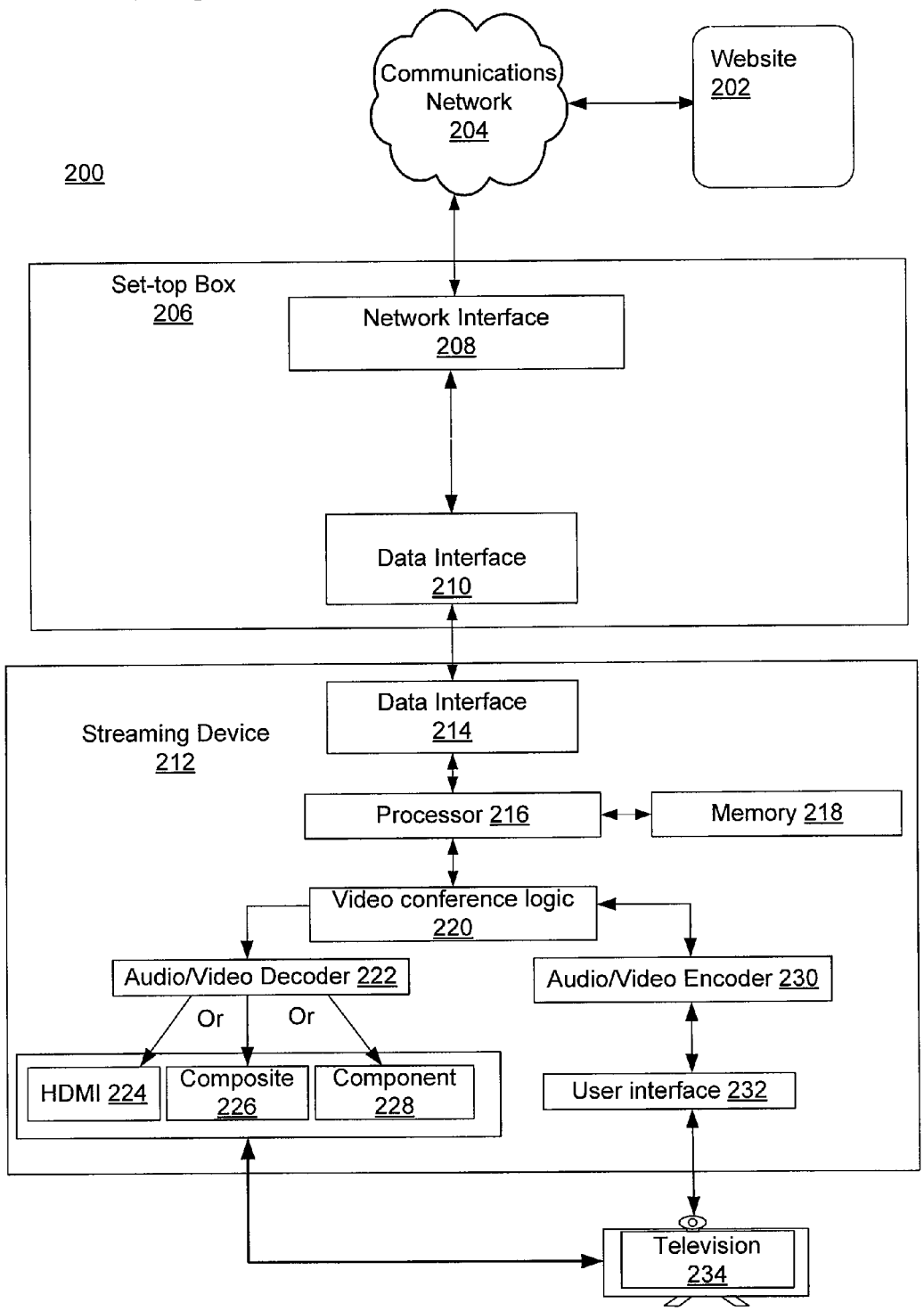
FIG. 2 is a block diagram of a communications system in accordance with an illustrative embodiment.

FIG. 2 is a block diagram of a communications system in accordance with an illustrative embodiment. The communications system 200 is a particular implementation of portions of the communications environment 100 of FIG. 1. In one embodiment, the communications system 200 may include a website 202, a communications network 204, a set-top box 206, which may further include a network interface 208 and a data interface 210, a television forwarding device 212, which may further include a data interface 214, a processor 216, a memory 218, video conference logic 220, audio/video decoder 222, HDMI 224, composite connector 226, component connector 228, audio/video encoder 230, a user interface 232, and a television 234.

Such a call described above with the public Internet cannot provide the same service level guarantees based on the network parameter unknowns and networking delays between Internet service providers network.

As shown, the set-top box 206 and the television forwarding device 212 may receive control signals, video images, and other content through the communications network 204. In one embodiment, the set-top box 206 may act as an intermediary device for the television forwarding device 212 and the television 234. In another embodiment, the communications network 204, set-top box 206, television forwarding device 212, and the television 234 may independently communicate with one another. The set-top box 206 and the television forwarding device 212 may include any number of hardware and software components. The hardware and software elements described for the set-top box 206 and television forwarding device 212 may be included or utilized in either device.

The network interface 208 is the component utilized to receive, buffet, process, and perform the other standard functions of the set-top box 206. The data interfaces 210 and 214 are components configured to transmit and receive signals between the set-top box 206 and the television forwarding device 212. Similarly, data interface 214 may receive signals from the set-top box 206 to process commands, receive user input, and otherwise carry on the functions as herein described. When a user subscribes to QoS functions, services, or guarantees for the video conferencing services, several network components may be configured by the communications service provider to provide the true network throughput required to guarantee optimal performance.

The network interface 208 may mark the video conferencing packet, stream or payload generated by the television forwarding device 212. The marking may identify the traffic destined upstream or towards the communications network 204. The marked packet or portion of the data stream may be treated with enhanced priority over the other packets, data streams or data coming from the home. For example, the marked packets may be processed by a CMTS, DSL modem, DSLAM, edge switch, and edge router. Similarly, video conference traffic may be switched or routed back down the same elements mentioned above to another user's home or the origination point of the conference call. Priority markings, such as differentiated services, Terms of service, IEEE 802.1q, IEEE 802.10, and so forth, may be used to ensure true video quality at the bit rate selected by the user. If the communications network 204 begins to experience some form of impairments within these systems, such as congestion or latency, both the encoders and decoders on both ends may dial down the video payload parameters during the call while simultaneously maintaining video conferencing continuity. A video call or video conferencing QoS may not functional as described over the public Internet or other networks where the network parameters are unknown and network delays may be generated between Internet service providers.

The data interface 210 may communicate with the data interface 214 of the television forwarding device 212 using any number of wireless standards, protocols, or formats. In one embodiment, the data interface 210 may communicate with the data interface 214 using a channel of a WiFi signal. The WiFi signal may be designated for use or integrated as part of a home wireless network utilized by the user. In another embodiment, the data interfaces 210 and 214 may use a Bluetooth signal or equivalent to perform communication. The different wireless signals or channels utilized by the data interfaces 210 and 214 may vary based on the media content, television channel, or other programming selected by a user utilizing the television 234 interconnected to the television forwarding device 212.

The processor 216 is circuitry or logic enabled to control the execution of a set of instructions. The processor 216 may be a microprocessor, digital signal processor, central processing unit, or other device suitable for controlling the television forwarding device 212, including one or more hardware and software elements, executing software, instructions, programs and applications, converting and processing signals and information, and performing other related tasks. The processor 216 may be a single chip or integrated with other computing or communications elements. In one embodiment, the processor 216 may convert and format an incoming signal received through the data interface 214 for display by one or more televisions and transmission to one or more wireless adapters.

The memory 218 is a hardware element, device, or recording media configured to store data for subsequent retrieval or access at a later time. The memory 218 may be static or dynamic memory. The memory 218 may include a hard disk, random access memory, cache, removable media drive, mass storage, or configuration suitable as storage for data, instructions, and information. In one embodiment, the memory 218 and processor 216 may be integrated. The memory 218 may use any type of volatile or non-volatile storage techniques and mediums. The set-top box 206 may similarly include a processor and memory.

The video conference logic 220 is the logic and circuitry for controlling a video conference. The video conference logic 220 may store preferences and options for performing video conferences in the memory 218. The video conference logic 220 may coordinate the exchange of video signals between the television 234 and a remote device. In one embodiment, the video conference logic 220 may control the video conference resolution displayed by the television 234. For example, the television forwarding device 212 may have bandwidth requirements that must be met in order to perform video conferencing. The video conference logic 220 may increase or decrease the line resolution bandwidth as needed. In one embodiment, the video conference logic 220 adjustments to the line resolution may be no adjustment at all. For example, once a line resolution is set by the user or by the video conference logic 220 based on the available bandwidth, the line resolution may remain unchanged during the entirety of the video conference. The video conference logic 220 may also control how the user may generate or accept an invitation to participate in a video conference. The invitation is an electronic message that specifies information about the participating party(s) and the video conference itself The invitation may include identifiers, radio buttons, selectors, icons, hyperlinks, or other interactive elements for accepting or rejecting the invitation. The video conference logic 220 may also control when and how bandwidth and line resolution, is adjusted automatically or based on user feedback.

The audio/video encoder 230 is a device configured to change a video and/or audio signal from the television 234 into a code. The code may be compressed for transmission, encryption, or translation. For example, the audio/video encoder 230 may be a H.264 video encoder that may be used to encode the video conferencing signal received from the television 234 in order to conserve bandwidth. In one embodiment, the audio/video encoder 230 encrypts the signal to better ensure the security and privacy of the video conference signal outside the intended parties. In one embodiment, the audio/video encoder 230 supports the following encoder requirements 704×480 4 times common intermediate format (CIF), 704×240 2 times CIF, 352×240 CIF, and 176×120 quarter CIF. In one embodiment, the communications network 204 may be an IPTV network operated by an IPTV service provider. The IPTV service provider may support four or more simultaneous full D1 standard definition video streams to the home. The video conference may be considered as one of those standard definition television services for the duration of the call on both ends. When the call or video conferencing session is disconnected by the user or remote user, the bandwidth is recovered and IPTV viewing returns to a standard process and format. The audio/video encoder 230 may be configured to dynamically adjust the video/audio quality of the video conference up or down based on the available bandwidth specified by threshold levels or streaming requirements. For example, the threshold may specify that at least 1 Mb of bandwidth be available for additional voice and data communications not involved in the video conference. A default threshold value may be automatically be established or a number of threshold may specify when decreases or increases in line resolution are made. For example, if the available bandwidth suddenly increases for a specified time period, the line resolution may be correspondingly adjusted upwards. In another embodiment, the threshold may be a performance level or measurement, such as throughput, dropped packets, packet delay, transmission delay, or other performance factors.

The audio/video decoder 222 is a device configured to change a received code back into a video and audio signal. The audio/video decoder 222 may be a program, application, or module configured to work with the data interface 214 or independently to process an incoming cable, satellite, data, or other signal to be displayed by the television 234. The audio/video decoder 222 may also format different Ethernet, DSL, cable, satellite, or other signals received by the television forwarding device 212 for any number of displays.

In the illustrative embodiments, formatting, decoding, and encoding for the television forwarding device 212 and set-top box 206 may be performed by various communicating elements. In another embodiment, the different components of the television forwarding device 212 and set-top box 206, as shown in FIG. 2, may be software modules that may be stored memory and executed by a processor to perform the video conferencing feature as herein described.

The audio/video decoder 222 may format the signal for output through various hardware or display interfaces, such as the HDMI 224, composite connector 226, and component connector 228. For example, the audio/video decoder 222 may convert the received signals into a high-definition format, a standard format, and any number of other formats that may utilize an interconnected television or display. In particular, the audio/video decoder 222 may communicate each of the different formats to the HDMI 224. The various ports and connectors that may be integrated with the HDMI 224 are further described in FIG. 3.

The HDMI 224, composite connector 226, and component connector 228 are the connectors, ports, or other receptacles that may be utilized to communicate the formatted signal to the television 234. For example, television forwarding device 212 may also include other hardware interfaces including audio, USB, firewire, and other types of connectors or ports that may allow the television forwarding device 212 or the set-top box 206 to transmit the formatted signal directly or indirectly through a communications link, line, or connection. For example, an Ethernet cable may be utilized between the television forwarding device 212 and video input port of the television 234.

Figure 3:
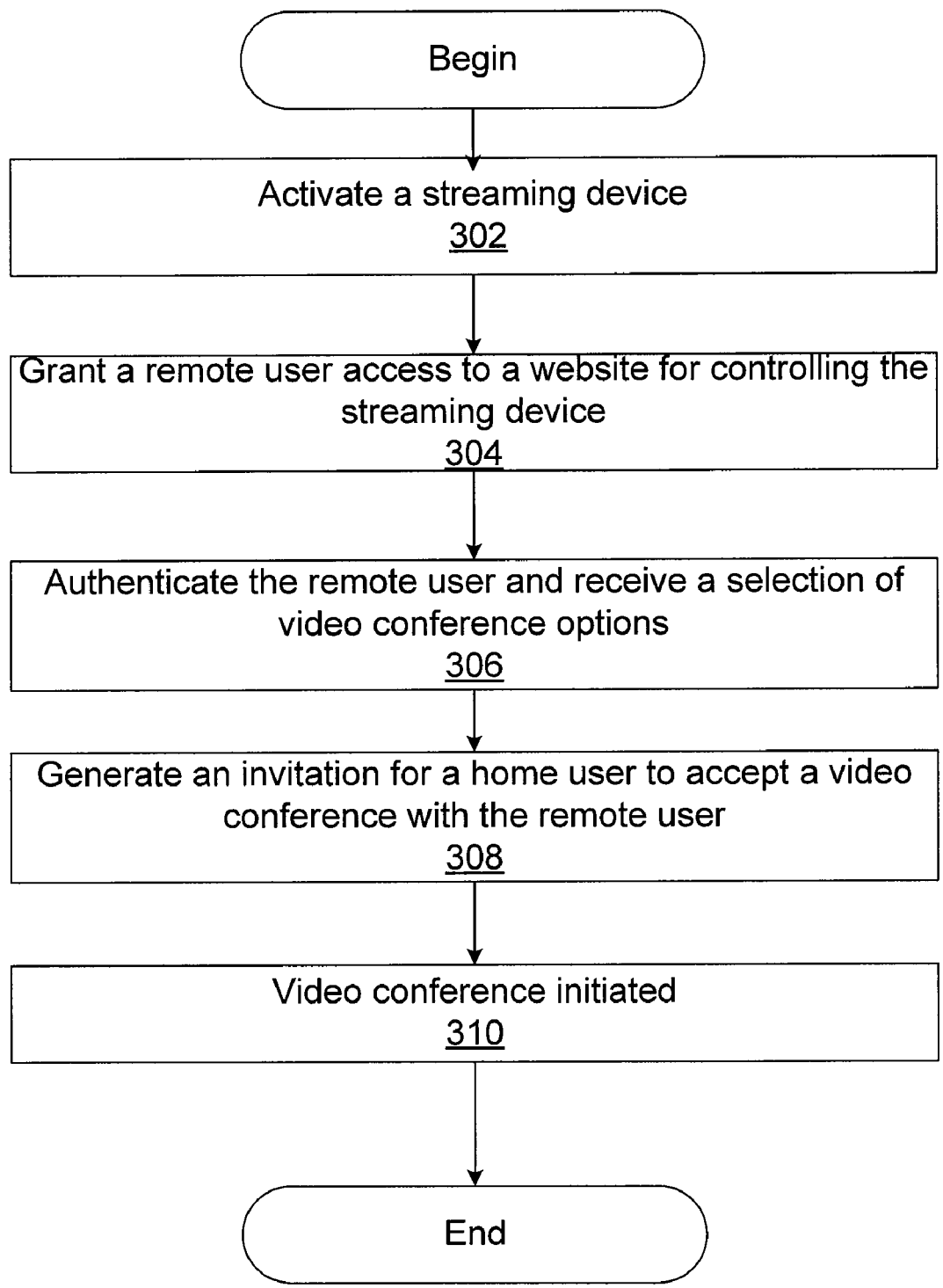
FIG. 3 is a flowchart of a process for initiating a video conference through a set-top box in accordance with an illustrative embodiment.

FIG. 3 is a flowchart of a process for initiating a video conference through a set-top box in accordance with an illustrative embodiment. The process of FIG. 3 may be implemented by a communications system. The communications system may include a remote device operated by a remote user, a communications network, and a television forwarding device operated by a home user or called party. The process may begin by activating a television forwarding device (step 302). The television forwarding device may be activated by being powered on. Alternatively, a remote access of the television forwarding device may be selected or activated.

Next, the communications system grants a remote user access to a website for controlling the television forwarding device (step 304). The user may utilize a personal computer enabled with a video camera to access the website through a network connection. In one embodiment, the website may be hosted by the communications management system. In one embodiment, a security server of the communication system may perform the authentication or verification to grant the remote user access to the website.

Next, the communications system authenticates the remote user and receives a selection of video conference options (step 306). The user may be authenticated using a username, password, cookie, FOB, or other secure identifier. The video conference options may include a selection of one or more parties to call. For example, the remote user may select a user from a plurality of contacts stored in a network address book that is accessible from the website. The video conference options may also include a video line resolution, volume level, and video display configuration.

Next, the communications system generates an invitation for a home user to accept a video conference with the remote user (step 308). The invitation may be a message, alert, prompt, or combination of communications that inform the user of the invitation to initiate a video conference. The invitation may specify the identity of the user or device requesting the video conference. For example, the invitation may include a picture associated with the user, such as "Accept a video conference with mom?" In one embodiment, the television forwarding device may be configured to power on the television or play an audio alert in order to allow the home user to select to view the video conference. The television forwarding device may also display a pop-up window with a "join" invitation or display a picture-in-picture request to accept a video conference with a remote user while simultaneously displaying the remote user's picture.

Next, the video conference is initiated (step 310). Once the video conference is initiated, video content is streamed between the remote user and the home user. In one embodiment, the remote user may control a video camera integrated or connected with the television forwarding device as well as a video camera integrated with or connected to a remote device.

Once the video conference or call is completed, a disconnect message may be initiated by either communicating party which terminates the communication between the television forwarding device and the remote device. The illustrative embodiments may allow a communication service provider to expand services to users as well as revenue. The communications service provider and television forwarding device/set-top box providers may share revenues generated from the video conferencing feature.

The remote device may be a personal computing or communications device, such as a laptop. In another embodiment, the remote device may be another television forwarding device or set-top box. The user may utilize an enhanced program guide to initiate the video conference and invitation as previously described.

Figure 4:
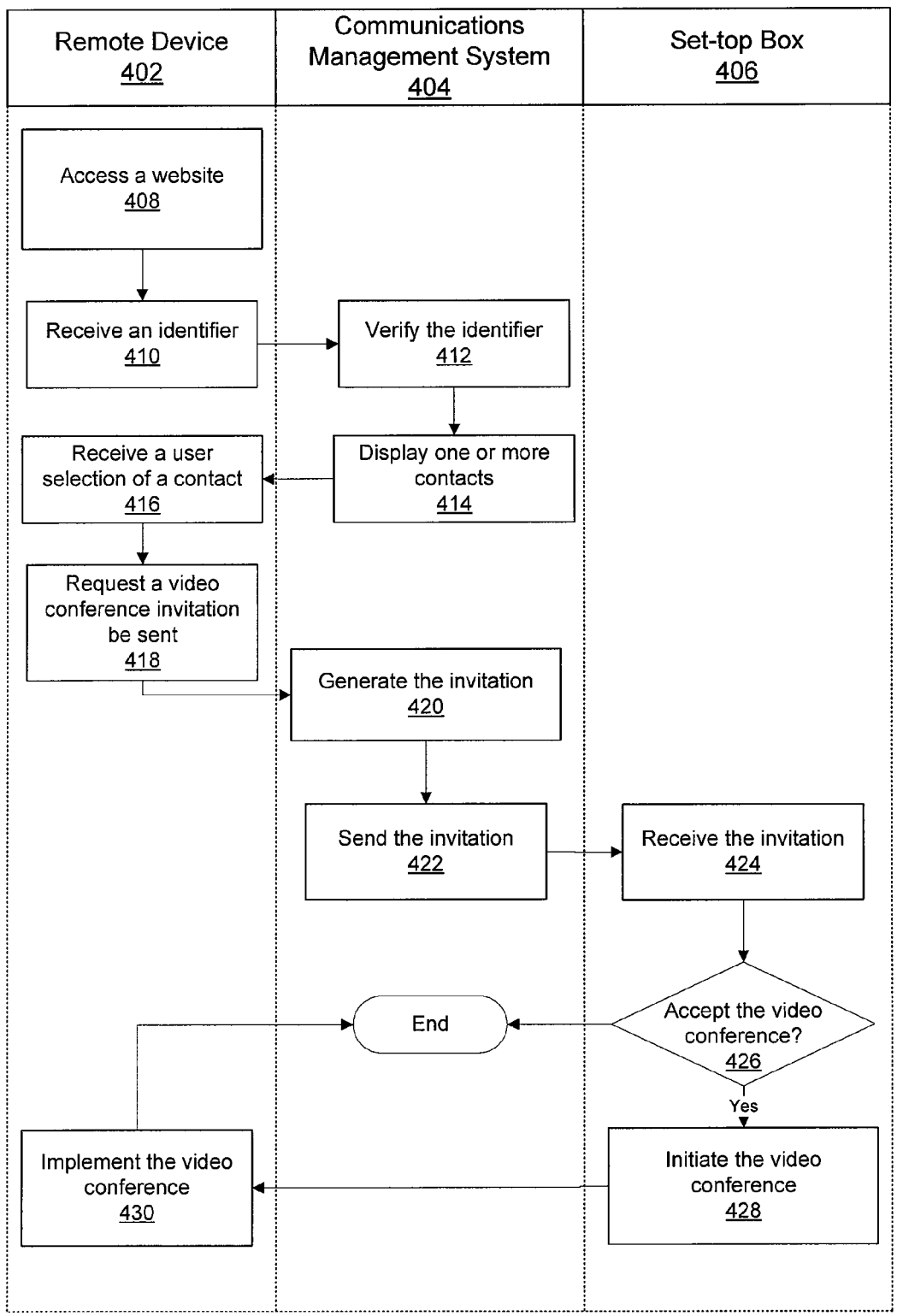
FIG. 4 is a flowchart of a process for implementing a video conference through a set-top box in accordance with an illustrative embodiment

FIG. 4 is a flowchart of a process for implementing a video conference through a set-top box in accordance with an illustrative embodiment. The process of FIG. 4 may be implemented by a remote device 402, a communications management system 404, and a set-top box 406. In one embodiment, the remote device 402 is a laptop with an internal or external video camera. In another embodiment, the remote device 402 may be a wireless device, such as a cell phone or PDA. The communications management system 404 may include one or more network devices, authentication modules, communications networks, and other network elements. In one embodiment, the set-top box 406 may include a digital video recorder (DVR). In another embodiment, the set-top box 406 may include or communicate with a television forwarding device, such as a Slingbox.

The process may begin with the remote device 402 accessing a website (step 408). In one embodiment, the website may be served or managed by the communications management system 404. In another embodiment, the website may be an application that is opened or executed by the remote device 402.

The remote device receives an identifier (step 410). The identifier may be a username, password, radio frequency identification tag, phone number, IP address, cookie, account number, or other identifier utilized to authenticate the remote user. Next, the communications management system 404 verifies the identifier (step 412). A server, database, or software module of the communications management system 404 may be used to verify the identifier.

The communications management system 404 may display one or more contacts (step 414). The contacts may be displayed as part of a network address book communicated to the remote device 402 for visual display to the remote user. For example, the remote user may select to initiate a video conference with contacts labeled as home, business, or vacation home.

Next, the remote device 402 receives a user selection of a contact (step 416). The user selection may be made by selecting a number, picture, profile, or by manually entering communications information. The remote device 402 requests a video conference invitation be sent (step 418). A graphical user interface displayed by the remote device 402 may be utilized to receive user input, selections, and requests from the remote device 402.

Next, the communications management system 404 generates the invitation (step 420). The invitation may be sent as a signal, message, or other communication receivable by the set-top box 406. In another embodiment, the invitation may be a voice message that is received by the remote device 402 for subsequent transmission to the set-top box 406.

Next, the set-top box 406 may receive the invitation (step 424). The invitation may be displayed as a prompt or message on a television in communication with the set-top box 406. The set-top box 406 determines whether to accept the video conference (step 426). The determination of step 426 is made based on user input or user preferences. For example, the set-top box may be configured to automatically accept a video conference invitation from a family member when received. In another embodiment, a manual selection by a user may be required before the video conference is considered accepted. If the set-top box 406 determines not to accept the video conference, the process ends. If the set-top box 406 determines to accept the video conference in step 426, the set-top box 406 initiates the video conference (step 428) and the remote device 402 similarly implements the video conference (step 430). During steps 428 and 430, streaming video images, text, and voice communications may be communicated between the remote device 402 and set-top box 406. In one embodiment, the communications management system 404 may buffer, process, or route the communications signals, packets, or data to facilitate the communications.

Figure 5:
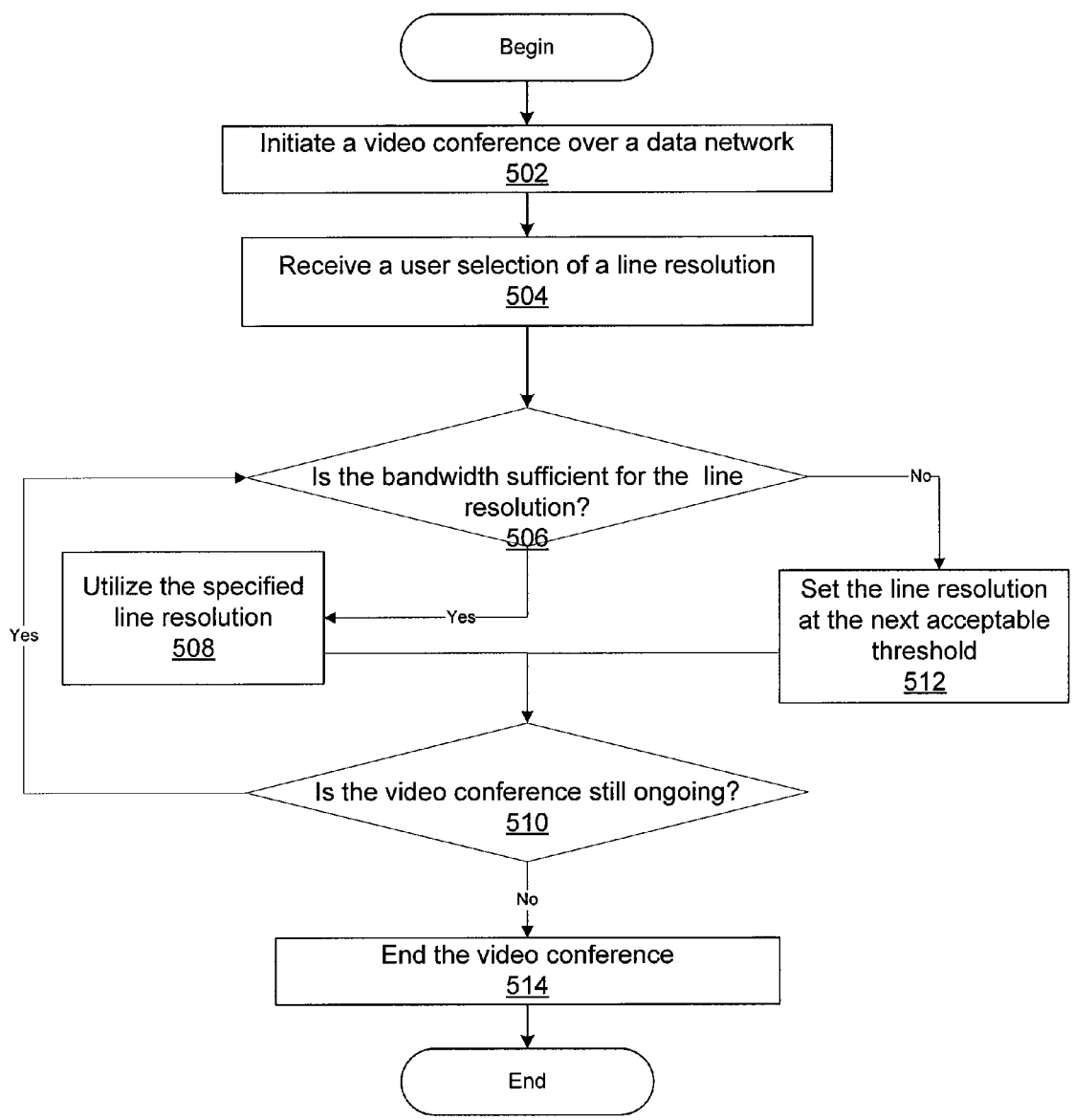
FIG. 5 is a flowchart of a process for adjusting bandwidth in accordance with an illustrative embodiment.

FIG. 5 is a flowchart of a process for adjusting bandwidth in accordance with an illustrative embodiment. The process of FIG. 5 may be implemented by a communication system. As previously described, the communication system may include one or more remote devices, a communications management system, and a television forwarding device or set-top box. In one embodiment, the video communications may occur between set-top boxes that are communicating through a single IPTV network. In another embodiment, the video communications may occur between a set-top box or television forwarding device and a remote user through multiple communications service providers and associated networks. User input may be received through a menu or enhanced program guide (EPG) from one or more users.

The process may begin by initiating a video conference over a data network (step 502). The video conference may be initiated based on a selection by a remote user. For example, the daughter of a family may wish to speak with her parents after a day of classes at college and may open a website or select an application to initiate the video conference. The data network of step 502 may be any form of cable, satellite, DSL, IPTV, or combination of network types. The remote user may be required to select a phone number, user name, IP address, or other identifier to validate that the user is authorized to communicate through a video conference or that the remote user and user communicate through the same network or different networks. The user or called customer may be validated as being a valid subscriber to the IPTV video conferencing services by a billing system and a DRM server. A pop-up or join invitation may be presented to the user to accept or decline the video conference call. The middle ware and other communications components, elements, and equipment between the remote user and user may implement the conference call. The line resolution may be different based on separate selections by the remote user and user.

Next, the communication system receives a user's selection of a line resolution (step 504). The line resolution may specify the size, pixels, and picture quality of video images streamed to or from the remote user. In one embodiment, the user selection of step 504 may be made by a user with physical access to the set-top box. For example, the user may minimize the line resolutions in order to continue viewing a television program using a picture-in-picture function of the set-top box that may be used in conjunction with the video conferencing feature herein described. In one embodiment, the line resolution may be set by default in the event a user does not answer or select a line resolution.

Next, the communications system determines whether the bandwidth is sufficient for the line resolution (step 506). The determination of step 506 may be based on on-going utilization of the bandwidth that is available through the set-top box. In one embodiment, an organization, business, or home may have a limited amount of bandwidth. As a result, if one or more voice-over-IP phones (VoIP), computers, and/or televisions are operating simultaneously, the available bandwidth may be decreased significantly. As a result, the determination of step 506 may insure that the video conference may occur regardless of bandwidth fluctuations. If the bandwidth is sufficient for the line resolution, the communication system utilizes the specified line resolution (step 508).

Next, the communications system determines whether the video conference is still ongoing (step 510). If the video conference is still ongoing, the communications system again determines whether the bandwidth is sufficient for the line resolution (step 506). If the bandwidth is not sufficient for the line resolution in step 506, the communications system sets the line resolution at the next acceptable threshold (step 512). The next acceptable threshold is the next available level or threshold below the line resolution that may have been specified or previously attempted by the communications system. For example, the line resolution may be decreased from a high level to a medium high level during step 512. Next, the communications system determines whether the bidder video conference is still ongoing (step 510). If the video conference is not still ongoing in step 510, the communications system ends the video conference (step 514). The determinations of steps 506 and 510 are repeated continuously for a number of times in order to ensure that the line resolution is updated as needed for the video conference. As a result, the appropriate bandwidth is used as automatically selected or based on a user's specification. Additionally, if a signal does occur, the resolution may be corrected as needed to ensure clear communications between the parties.

Figure 6:
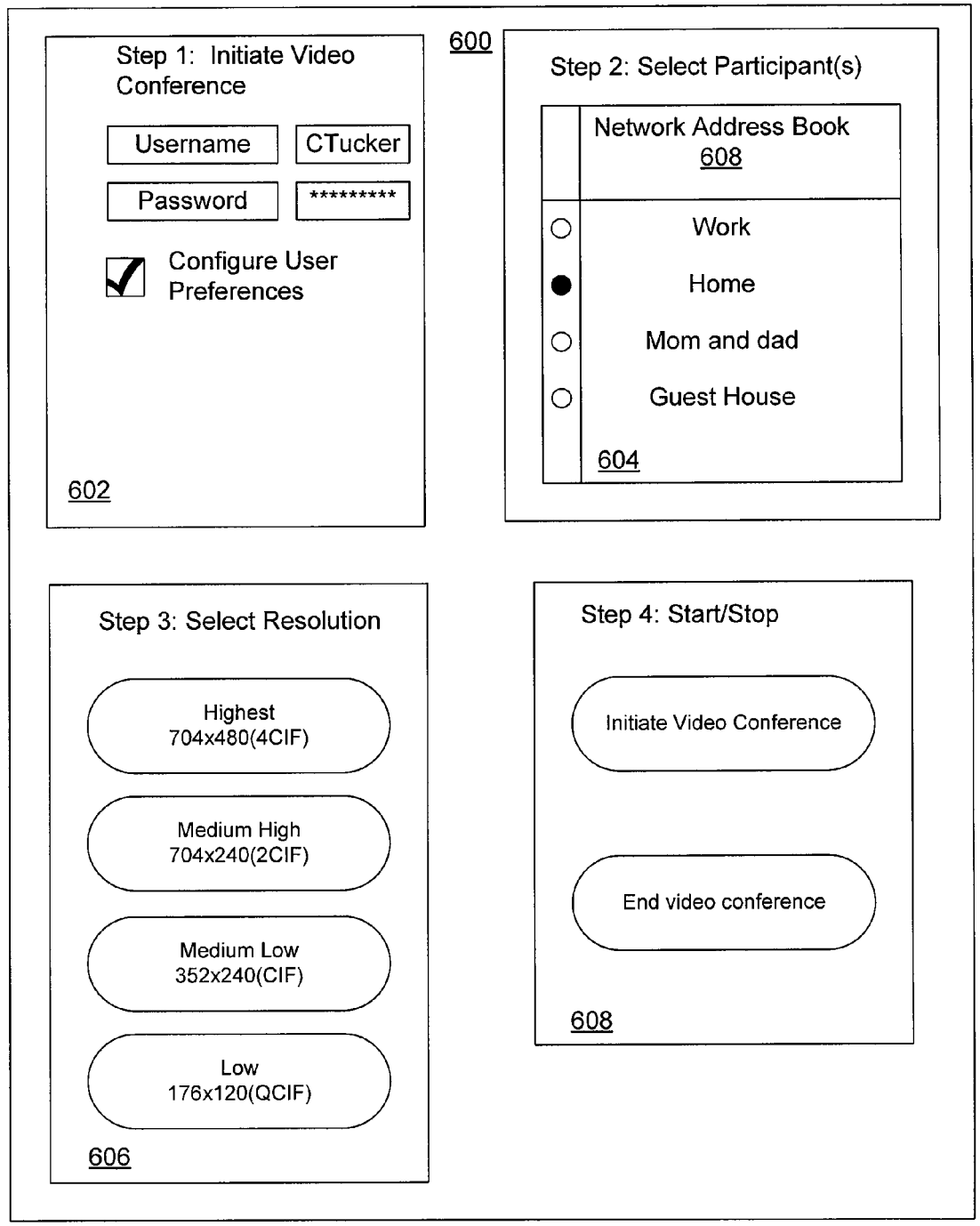
FIG. 6 is a pictorial representation of a user interface for video conferencing utilizing a set-top box in accordance with an illustrative embodiment.

FIG. 6 is a pictorial representation of a user interface for video conferencing utilizing a set-top box in accordance with an illustrative embodiment. FIG. 6 illustrates one embodiment of a user interface 600. The user interface may be a website application or graphical user interface for receiving user input and displaying information options and preferences regarding a video conference through a set-top box or a television forwarding device.

The user interface 600 may include sections 602, 604, 606, and 608. In one embodiment, the different sections 602, 604, 606, and 608 may represent different steps that are taken during the video conferencing process before the video conference is implemented. In another embodiment, the sections 602, 604, 606, and 608 may be presented sequentially to a user based on selections in the prior section. For example, the sections 602, 604, 606, and 608 may be web pages that are sequentially displayed to the user to complete the video conference. The sections may include icons, fields, buttons, drop down elements, or other interfacing elements for receiving a user selection. In one embodiment, the user interface 600 may be presented to a remote user through a touch screen, allowing the user to both receive information and make selections by selecting or tapping a portion of the screen.

Section 602 may be utilized to initiate a video conference or set user preferences that are utilized during one or more video conferences. For example, the section 602 may be utilized to receive a user name and password. The section 602 may also be used to configure user preferences and options. For example, the user preferences and options may specify default settings, including importing contacts from a global or local address book, default resolution settings, and any number of other options. In another example, the set-top box implementing the video conference may be configured to display a picture-in-picture invitation of the calling party when an invitation is received. Similarly, the set-top box may be configured to automatically power on the television for play and audible alert through a surround sound system indicating that an invitation has been received to participate in a video conference.

Section 604 may allow the remote user to select one or more parties to call. For example, while on a business trip, a spouse may select to call other family members by selecting "home". In another embodiment, the section 604 may be utilized to implement a video conference with multiple parties. For example, the set-top box of a user may be utilized to carry on a small business meeting for users without a means to buy expensive video conferencing equipment.

The section 606 may allow a user to select a line resolution that may be utilized by the set-top box. The line resolution effects bandwidth as previously discussed and as a result, at any time before or during the video conference, the user may adjust the bandwidth. Similarly, the remote user may elect to adjust the bandwidth on the remote device for ensuring that the quality of service and video image are of sufficient quality to carry on effective communications.

Section 608 may allow a user to initiate and end the video conference. In another embodiment, the remote user may utilize the user interface 600 to control a video camera that is integrated or external to the set-top box. For example, the remote user may zoom or pan the camera as needed. This may be particularly useful when communicating with small children, handicapped individuals, or other users that may have limited mobility or access to the set-top box television forwarding device or television.

Figure 7:
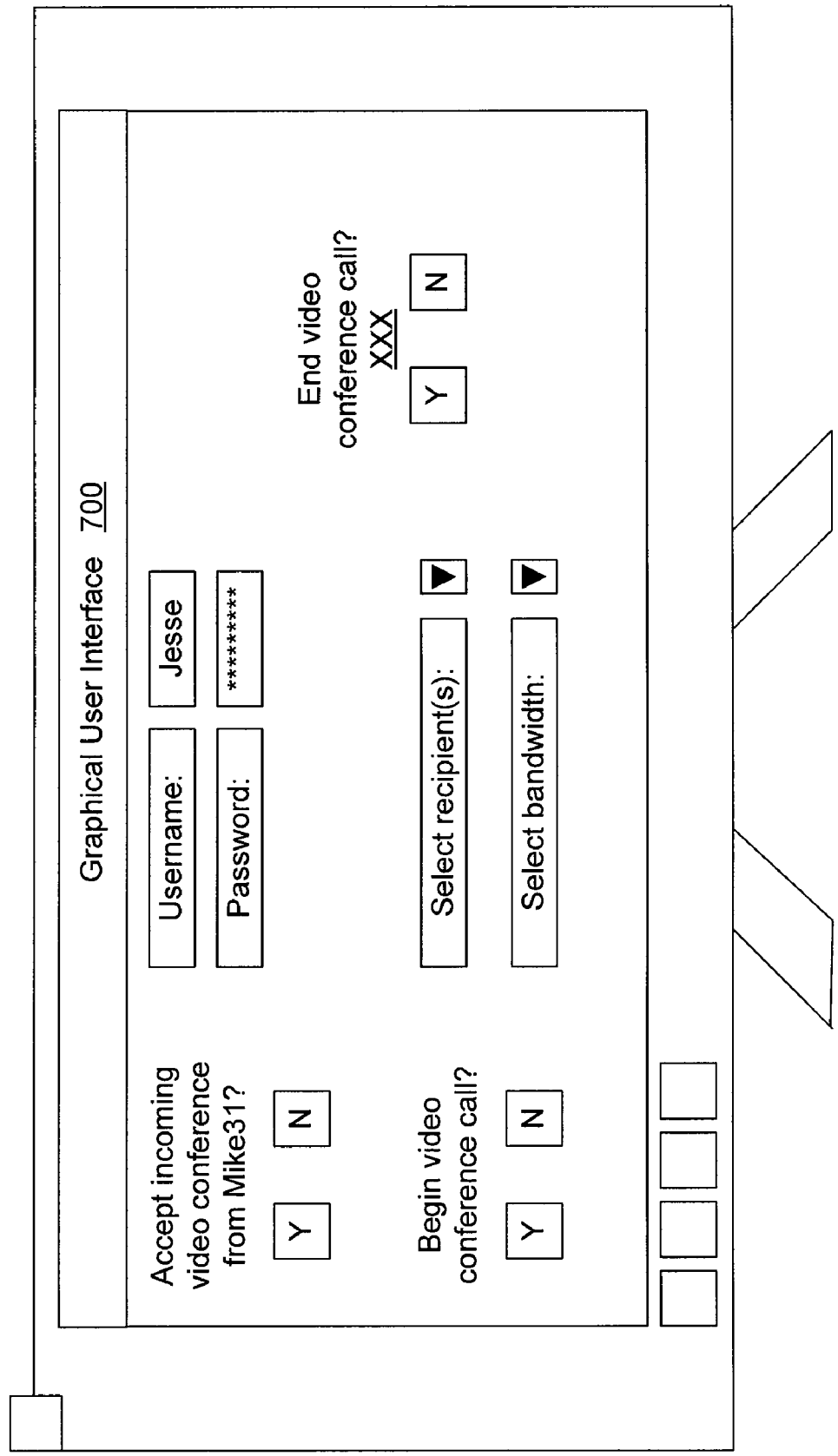
FIG. 7 is a pictorial representation of a graphical user interface for video conferencing utilizing a television forwarding device in accordance with an illustrative embodiment.

FIG. 7 is a pictorial representation of a graphical user interface for video conferencing utilizing a television forwarding device in accordance with an illustrative embodiment. FIG. 7 is an alternate illustration of a graphical user interface 700. As previously described in FIG. 6, the user may send and receive information utilizing the graphical user interface 700 displayed to the user through a television computer monitor or other display element.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for adjusting resolution for a video conference through a set-top box, the method comprising:
   receiving an invitation to accept a video conference through a set-top box;
   setting a line resolution for the video conference based on user input;
   determining whether available bandwidth is at a threshold to support the line resolution;
   adjusting the line resolution based on the determination; and
   implementing the video conference utilizing the adjusted line resolution.

2. The method according to claim 1, wherein the set-top box is a television forwarding device operable to store media content and deliver the media content to a remote user through a web portal accessible utilizing a network connection.

3. The method according to claim 1, wherein the receiving further comprises:
   receiving preferences for the video conference, wherein the preferences indicate at least the line resolution.

4. The method according to claim 1, wherein the setting is performed automatically based on a default level for the line resolution.

5. The method according to claim 1, wherein the line resolution is adjusted up or down based on the available bandwidth.

6. The method according to claim 1, wherein the adjusting further comprises:
   adjusting the line resolution to a second line resolution with a lower bandwidth requirement.

7. The method according to claim 6, wherein the lower bandwidth requirement of the second line resolution is a threshold that is pre-set.

8. The method according to claim 1, wherein the line resolution is any of 704×480 4 times common intermediate format (CIF), 704×240 2 times CIF, 352×240 CIF, and 176×120 quarter CIF.

9. The method according to claim 1, wherein the determining is performed based on the user input to increase or decrease the line resolution.

10. The method according to claim 1, wherein the video conference is performed through an Internet protocol television (IPTV) connection.

11. The method according to claim 1, wherein the user input is specified by a remote user that initiates the video conference.

12. The method according to claim 1, wherein the setting is performed through a remote control by a user at a location of the set-top box.

13. The method according to claim 1, wherein the threshold is specified by a user.

14. A system for video conferencing, said system comprising:
   a server configured to provide a website accessible by a remote user through a network connection, wherein the remote user selects to initiate a video conference with a user by sending an invitation; and
   a set-top box in communication with the server operable to implement the video conference in response to the user accepting the invitation from the remote user to begin the video conference, wherein the set-top box sets a line resolution for the video conference based on user input, wherein the set-top box determines whether available bandwidth is at a threshold to support the line resolution, and wherein the set-top box adjusts the line resolution in response to determining the line resolution is not at the threshold.

15. The system according to claim 14, wherein the set-top box is a television forwarding device configured for remote access.

16. The system according to claim 14, a database in communication with the server, wherein the database is configured to verify that the remote user utilizing a communications device is authorized to communicate with the set-top box, and wherein the database provides a digital rights management (DRM) key to the set-top box and the remote user for encoding and decoding the video conference.

17. The system according to claim 14, wherein the set-top box includes a video camera for recording audio and video of the user, and wherein the remote user controls the video camera.

18. A set-top box for video conferencing comprising:
   a processor for executing a set of instructions; and
   a memory for storing the set of instructions, wherein the set of instructions are configured to:
      receive an invitation to accept a video conference through the set-top box;
      set a line resolution for the video conference based on user input;
      determine whether available bandwidth is at a threshold to support the line resolution;
      implement the video conference utilizing the line resolution; and
      adjust the line resolution based on the determination.

19. The set-top box according to claim 18, wherein a user provides user input through an enhanced program guide.

20. The set-top box according to claim 19, wherein the user may select from a plurality of line resolutions before and during the video conference.

* * * * *